Figure 2A:
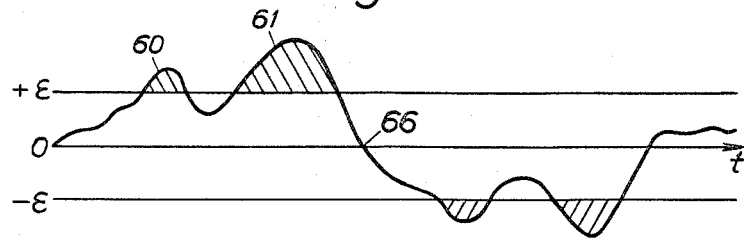
Figure 2B:
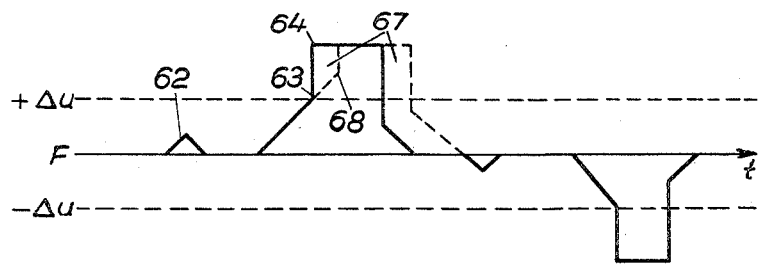
Figure 2C:
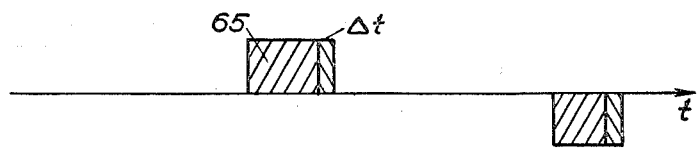

April 23, 1968     S. SUNDELL     3,379,817
ELECTRODE CONTROL DEVICE
Filed May 24, 1965     3 Sheets-Sheet 1
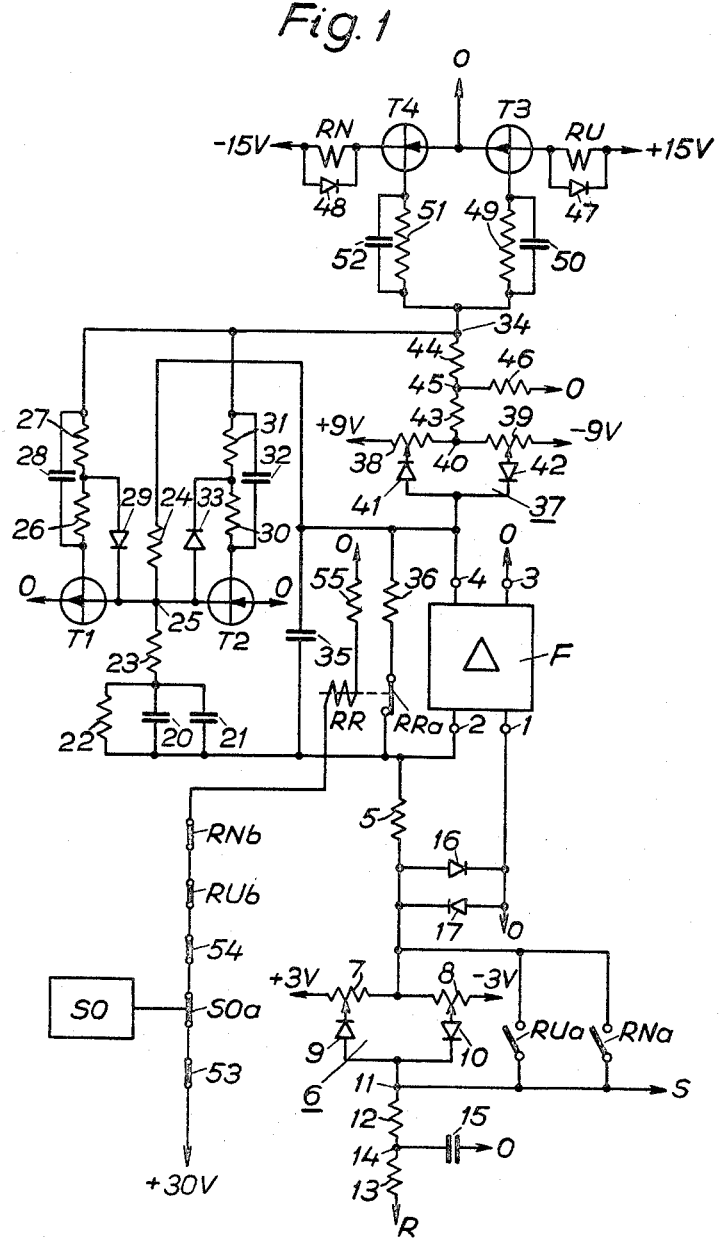
INVENTOR.
SIGVARD SUNDELL
BY
Bailey, Stephens & Huettig
ATTORNEYS

United States Patent Office 3,379,817
Patented Apr. 23, 1968

3,379,817
ELECTRODE CONTROL DEVICE
Sigvard Sundell, Vasteras, Sweden, assignor to Allmänna Svenska Elektriska Aktiebolaget, Vasteras, Sweden, a corporation of Sweden
Filed May 24, 1965, Ser. No. 458,165
11 Claims. (Cl. 13—13)

In order not to unnecessarily disturb the furnace processes in electrode furnaces, it is desirable to avoid too quick and frequent changes of the position of the electrodes. Previously so-called sampling control has been proposed and used, the control device being connected at certain intervals. During the time between the connections no control can take place, but an integrating amplifier is continually connected in and senses a possible fault and integrates the fault during the complete sampling period. A relatively minor fault which normally has no great influence on the furnace process will also be integrated to such a great value during the long sampling period that the control device will start a control when it is connected in at the end of the sampling period. This means consequently that the control can also take place for relatively minor faults, which can entail unnecessarily disturbed operating conditions in the furnace.

The present invention relates to an electrode control device for electrode furnaces for producing quiet operation but also quick control when strong disturbances occur. The device comprises at least one amplifier, whose input is supplied with a signal depending on the electrode current and whose output can be connected to means for triggering the electrode control device. The invention is characterized in that an integration device is connected to the input of the amplifier for integrating a signal supplied to the amplifier and dependent on the electrode current and which by means of a connection device which is controlled by the output signal of the amplifier is arranged to be disconnected as soon as said output signal rises above a certain adjustable value, upon which the amplifier is connected to a device for control of the electrode control device.

In a control device according to the invention the integration constant of the integration device is chosen relatively low and this means that the device does not respond to small faults or faults of short duration. Because the point on the integration curve at which the integration device is disconnected and the control process starts is easily adjustable, the device is very suitable for furnaces of different types and for different operating conditions.

Further characteristics and distinguishing features are evident from the following description of an embodiment of the invention shown in FIG. 1. The FIGURES 2a–d show the conditions during continuous control, while the FIGURES 3a–e show the corresponding conditions during sampling control.

An amplifier F has two input terminals 1 and 2 and two output terminals 3 and 4. Of these, the terminals 1 and 3 are connected to zero potential. The input terminal 2 is connected across a resistor 5 to a blocking device 6, which consists of two series connected potentiometers 7 and 8. Diodes 9 and 10 are connected to each of the movable contacts of the potentiometers. The diodes are oppositely directed so that both positive and negative signals can pass to the amplifier. By means of variation of the position of the movable contacts of the potentiometer, a minimum value for the signal which the device 6 lets pass to the amplifier can be determined and thereby also an upper and the lower limit for a range within which the control device is insensitive.

The two diodes are connected to a common point 11, to which an electric magnitude S which is proportional to the phase current of the furnace and a reference magnitude R are both connected. This reference magnitude can be either the furnace voltage or a permanent voltage. The reference magnitude R is connected to point 11 through two resistors 12 and 13, which are connected in series, and their common point 14 is connected to zero potential through a capacitor 15. In order to limit the input signal on the amplifier F, two diodes 16 and 17 are connected between the connections of the input terminals of the amplifier. The maximum value of the signal is determined by the forward voltage drop. The blocking device 6 can be short circuited by means of two parallel relay contacts RN$a$ and RU$a$ of a relay for down control RN and a relay for up control RU. These contacts are open when the relays are unenergized.

The integration device is connected across the terminals 2 and 4 of the amplifier and consists of two parallel connected capacitors 20 and 21, which are connected in parallel to a resistor 22. The capacitors are of magnitude device 10 μf. The parallel connection of the capacitors and the resistor is connected in series with two series connected resistors 23, 24. The connection point 25 between the two last mentioned resistors is connected with the collectors of two transistors T1 and T2, whose two emitter electrodes are at zero potential. A series connection of two resistors 26, 27 is connected to the base electrode of the transistor T1 and parallel with the resistors a capacitor 28 is connected. The connection point between the resistors is connected to point 25 through a diode 29. In the same way a series connection of two resistors 30 and 31 is connected to the base electrode of the transistor T2, connected in parallel with a capacitor 32. Between the point 25 and the connection point between the resistors 30 and 31, a valve 33 is connected. These two resistor combinations are connected to a point 34. Further, a small capacitor 35 of magnitude of approximately 0.1 μf. is connected beween the terminals 2 and 4 of the amplifier. The two terminals can be short circuited by means of a contact RR$a$ on a control relay RR, whose function will be explained later. A resistor 36 lies in series with the contact. The capacitors 20, 21 can of course be replaced by a single capacitor.

A voltage limiter 37 is also connected to the output terminal 4 of the amplifier. It consists of two series connected potentiometers 38 and 39 connected partly to a common point 40, and partly to a potential of +9 and −9 v. respectively. Diodes 41, 42 are connected to each of the movable contacts of the potentiometers and both are connected to the output 4 of the amplifier. Between the points 34 and 40 two resistors 43 and 44 are connected and the connection point 45 between the resistors is connected to zero potential through a resistor 46.

By varying the position of the two movable contacts on the potentiometers of the voltage limiter, the value of the output signal of the amplifier can be varied, upon which the voltage limiter opens so that only one of the base electrodes of the transformers T1 or T2 is connected to the output of the amplifier, which results in the integration device 20, 21 becoming inactive. When the furnace is disturbed, said value can be raised and thereby a more quiet control is obtained.

For controlling the operating means of the electrodes the device has two intermediate relays RU and RN, where RU is actuated in up control and RN in down control. The relay RU is connected between +15 volts and zero potential across a transistor T3, while relay RN lies between zero potential and −15 volts across a transistor T4. The relay RU is shunted by a diode 47 and relay RN is shunted by a diode 48. The base electrode of the transistor T3 is connected to the point 34 through a resistor 49, which is shunted by a capacitor 50. In the same way the base electrode of the transistor T4 is connected to the point 34 through a resistor 51, which is shunted by a capacitor 52.

If a disturbance occurs and the amplitude of the disturbance signal at point 11 is greater than the degree of insensitivity to which the blocking device 6 is adjusted, the amplifier F receives an input signal and emits an output signal which is integrated by means of the capacitors 20, 21. If the fault lasts for a substantial time, the output voltage rises relatively slowly since the integration capacitors are relatively large. When the voltage adjusted on the voltage limiter 37 is reached, one of the transistors T1 or T2 becomes conducting and the capacitors are disconnected because the point 25 receives zero potential. Across the amplifier there is only the very small capacitor 35, with the result that the maximum output voltage of the amplifier is reached practically instantaneously. The output voltage is connected to the base of one of the transistors T3, T4 and one of the relays RU, RN is actuated and trips. Which of the transistors opens depends on the character of the fault signal which appears.

Each of the relays RU and RN has a contact RUa and RNa which both lie in parallel to the blocking device 6. When a relay is unenergized its contacts are open, but are closed when the relay switches on. When one of the contacts switches on, the blocking device is short circuited and control takes place until the fault is brought to zero. The blocking device 6 can, if so desired, be provided with a device for permanent short circuiting if a high sensitivity of the control is required.

The control relay RR previously mentioned is connected to a voltage source across a number of contacts. Of these contact 53 is intended to be opened during continuous control, since the integration device then must be disconnected. A sampling device SO has a contact SOa, which is normally closed, but which is opened when sampled control is used, which will be clarified later. The contact 54 is opened during adjusting of the device. RUb and RNb are contacts on the previously mentioned relays RU and RN and these contacts open when the respective relays switch on. Further a resistor 55 is included in the current circuit. As soon as any of the five mentioned contacts are open, the control relay RR is currentless and the contact RRa is closed and thereby the integration device is out of operation.

During normal operation continuous or sampled control can be used. During emptying of the furnace and at lowering of the electrodes, continuous control should be used.

During continuous control the equipment is continually connected in and the intensity of the control is dependent only on the size of the control fault and the condition of the voltage limiter 37 and the blocking device 6.

During sampled control the control will be carried out at certain intervals which are repeated at equal time spaces which are called sampling period times. This time can be adjusted in a known way by means of cam discs which rotate at a certain speed. If control takes place when the control time is finished, the control will thus continue and when it is finished the amplifier is blocked.

Figure 2D:
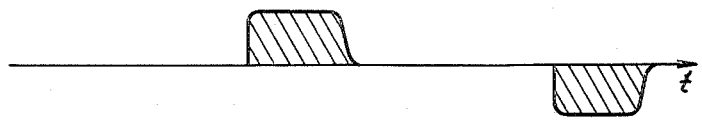

FIG. 2a–d show the conditions during continuous control. In FIG. 2a the fault curve is an unbroken line and the areas which lie outside the limits ±ε for the blocking device are shaded. The integration device begins to function first when the fault curve lies outside the said limits and in FIG. 2b the voltage across the output of the amplifier is shown. The peak on the fault curve occurring at 60 in FIG. 2a has so short a duration that the corresponding integrating voltage peak 62 in FIG. 2b lies below the level ΔU which is the position of the voltage limiter 37. At 61 in FIG. 2a a fault occurs which is of such long duration that the integrating voltage rises above the said level at 63 in FIG. 2b. Then the integration device is disconnected and the voltage rises practically instantaneously to 64 which corresponds to the maximum output voltage of the amplifier. At that instant relay RN receives an impulse for down control and the time during which the relay is connected in is shown at 65 in FIG. 2c. When the relay trips the contact RNa is closed and the device 6 is short circuited. Consequently the relay controls until the fault is zero at 66 in FIG. 2a. The output voltage of the amplifier falls below the value ΔU in FIG. 2b and the control voltage of the relay disappears, but since the relay is provided with resetting time-lag, it remains in the off position also during the time Δt in FIG. 2c. In FIG. 2d the control speed is shown as a function of the time and as is evident from the figure the control speed rises practically instantaneously to its maximum value. At 67 in FIG. 2b the behavior of the output voltage of the amplifier with a higher value positioned on the voltage limiter 37 is shown with a broken line. The value ΔU will in this case correspond to the position on the point 68.

It is evident from FIG. 2a that the device is thus completely insensitive to faults which lie within the area ±ε and which are determined by the blocking device 6.

Figure 3A:
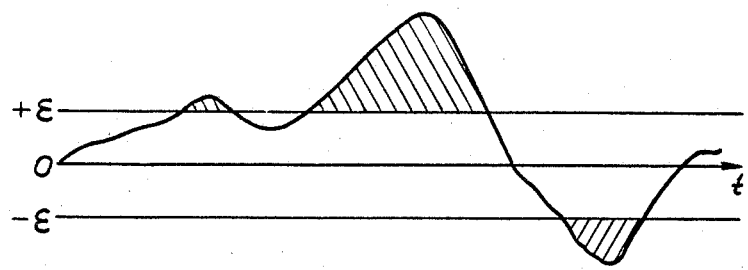
Figure 3B:
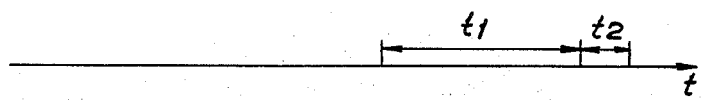
Figure 3C:
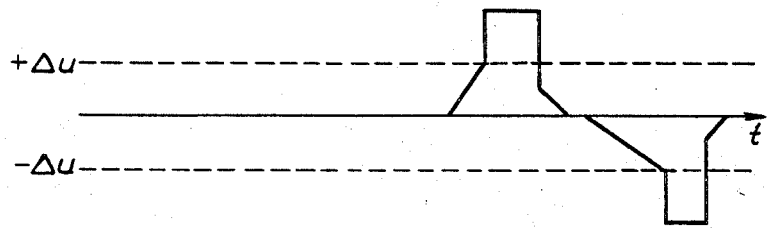
Figure 3D:
Figure 3E:
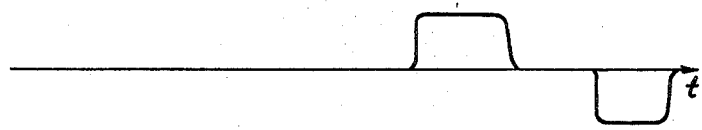

FIG. 3a–e show the conditions during sampled control. In FIG. 3a the fault curve is unbroken and the parts which lie outside the blocking limits ±ε are dashed. In FIG. 3b the line t1 indicates the time during which the sampling device SO is normally connected in, while t2 is the further connection time which passes if a control is going on when the ordinary connection time is finished. The time t2 ends when the fault curve goes through zero and the control interval ceases. FIG. 3c, 3d and 3e show the same as FIG. 2b, 2c and 2d.

A suitable embodiment of the invention is dimensioned so that 4% fault during 5 seconds gives 10 v. integrated value with the voltage limiter 37 in maximum position. During disturbed furnace operation sampled control is used, and the integration always begins from zero in each control interval.

I claim:

1. Electrode control device for electrode furnaces for producing quiet working but also quick control upon the occurrence of strong disturbances, comprising an amplifier, means to supply to the input of the amplifier a signal dependent on the electrode current, an electrode control means, means connecting the output of the amplifier to said electrode control means, an integration device connected to the input of the amplifier for integrating the signal supplied to the amplifier, and connection means controlled by the output signal of the amplifier to disconnect said integration device as soon as said output signal rises above a predetermined value and to connect the amplifier to said electrode control means.

2. Electrode control device according to claim 1, the integration device comprising at least one capacitor, two transistors controlled by the output signal of the amplifier, and means connecting the connection point between said transistors to said capacitor and to one of the output terminals of the amplifier.

3. Electrode control device according to claim 1, having variable blocking means connected ahead of the amplifier to prevent the amplifier from receiving any signal before the amplitude of the disturbance rises above a predetermined value.

4. Electrode control device according to claim 1, said connection means including voltage limiter means for determining when the integration device is to be disconnected.

5. Electrode control device according to claim 4, the side of the voltage limiter remote from the amplifier being connected to the base electrodes of the transistors.

6. Electrode control device according to claim 4, two transistors having their base electrodes connected to the side of the voltage limiter means remote from the amplifier, the emitter electrodes of the transistors being connected to zero potential, a voltage source, the collector of one of the transistors being connected to a plus pole of the voltage source, the collector of the other transistor being connected to the minus pole of the same voltage source, and relays for up and down control respectively having their windings connected between said poles and said collectors.

7. Electrode control device according to claim 6, each of the relays being provided with a contact which short circuits the blocking device when the relay switches on.

8. Electrode control device according to claim 7, each of the relays having a second contact, a control relay including means responsive to activation of one of said second contacts to open the excitation circuit of said control relay, said control relay having a contact responsive to deactivation of said control relay to short circuit the integration device.

9. Electrode control device according to claim 1, a small capacitor connected in parallel to the integration device over which the voltage rises practically instantaneously to the maximum value of the output voltage of the amplifier as soon as the integration device is disconnected.

10. Electrode device according to claim 9, said capacitor comprising a second integration device with very high integration constant.

11. Electrode control device according to claim 1, having a sampling device, and means to connect the sampling device in the circuit when sampled control is used.

References Cited
UNITED STATES PATENTS

| | | | |
|---|---|---|---|
| 2,809,319 | 10/1957 | Steele et al. | 13—13 XR |
| 3,316,340 | 4/1967 | Helsing et al. | 13—13 |

BERNARD A. GILHEANY, *Primary Examiner.*

R. N. ENVALL, JR., *Assistant Examiner.*